(12) United States Patent
MacFarlane et al.

(10) Patent No.: US 8,600,643 B2
(45) Date of Patent: Dec. 3, 2013

(54) VEHICLE AIR COMPRESSOR CONTROL SYSTEMS AND METHODS

(75) Inventors: Brian A. MacFarlane, Rochester Hills, MI (US); Steven A. Opiteck, South Lyon, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 13/589,576

(22) Filed: Aug. 20, 2012

(65) Prior Publication Data

US 2013/0275002 A1    Oct. 17, 2013

Related U.S. Application Data

(60) Provisional application No. 61/622,687, filed on Apr. 11, 2012.

(51) Int. Cl.
*B60G 13/00* (2006.01)
*B60G 13/14* (2006.01)
*B60T 13/138* (2006.01)

(52) U.S. Cl.
USPC ............. 701/100; 701/37; 701/45; 701/48; 701/91; 701/103; 180/176; 180/177

(58) Field of Classification Search
CPC ...... B60W 10/00; B60W 10/30; B60G 11/00; B60G 11/30; B60G 13/00; B60G 13/14
USPC ......... 701/37, 48, 91, 100, 103; 180/176–177
See application file for complete search history.

(56) References Cited

U.S. PATENT DOCUMENTS

| | | | |
|---|---|---|---|
| 2001/0005803 A1* | 6/2001 | Cochofel et al. | 701/1 |
| 2005/0218632 A1* | 10/2005 | Cuevas et al. | 280/730.1 |
| 2006/0293816 A1* | 12/2006 | Li | 701/38 |
| 2008/0021611 A1* | 1/2008 | Hiebert et al. | 701/37 |
| 2009/0105905 A1* | 4/2009 | Hoffman | 701/36 |

FOREIGN PATENT DOCUMENTS

WO    WO 2005097559 A2 * 10/2005

OTHER PUBLICATIONS

U.S. Appl. No. 13/571,778, filed Aug. 10, 2012, MacFarlane et al.

* cited by examiner

*Primary Examiner* — Mary Cheung
*Assistant Examiner* — Atul Trivedi

(57) ABSTRACT

A suspension control system for a vehicle includes a pressure increasing module and a compressor control module. In response to a startup of the vehicle, the pressure increasing module: selectively sets a pressure increase signal to a first state when an air pressure within air bags of a suspension system is less than a predetermined pressure; and selectively sets the pressure increase signal to a second state when the air pressure is greater than the predetermined pressure. In response to the startup of the vehicle, the compressor control module: operates an air compressor of the suspension system when the pressure increase signal is in the first state; and disables operation of the air compressor when the pressure increase signal is in the second state.

20 Claims, 3 Drawing Sheets

VEHICLE AIR COMPRESSOR CONTROL SYSTEMS AND METHODS

CROSS-REFERENCE TO RELATED APPLICATIONS

This application is related to U.S. Provisional Patent Application No. 61/622,687, filed on Apr. 11, 2012. The disclosure of the above application is incorporated herein by reference in its entirety.

FIELD

The present disclosure relates to vehicle suspensions, and more specifically to systems and methods for controlling an air compressor of a suspension system of a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle suspensions typically include springs, shock absorbers, and linkages that connect a frame or body of a vehicle to wheels of the vehicle. Linkages are also referred to as links. Suspension systems affect vehicle ride and handling. Vehicle ride and handling affect safety, drivability, and whether vehicle occupants are isolated from road noise, bumps, and vibrations.

Air suspension is a type of vehicle suspension that typically includes air shocks or air springs, an air pump or compressor that is electrically or mechanically (e.g., engine) driven, and a control valve that may be adjusted to release air from the air bags.

The compressor pressurizes air in the air bags. The air bags can provide all of the spring force needed to support the vehicle, or the air bags can augment the spring force provided by (non-air) springs. The pressure in the air bags may be controlled to improve ride quality and/or to provide a self-leveling suspension. A self-leveling suspension maintains a vehicle at a desired ride height regardless of the load on the vehicle. A self-leveling suspension may include one or more ride-height sensors so the ride height of a vehicle may be controlled using closed-loop feedback.

SUMMARY

A suspension control system for a vehicle includes a pressure increasing module and a compressor control module. In response to a startup of the vehicle, the pressure increasing module: selectively sets a pressure increase signal to a first state when an air pressure within air bags of a suspension system is less than a predetermined pressure; and selectively sets the pressure increase signal to a second state when the air pressure is greater than the predetermined pressure. In response to the startup of the vehicle, the compressor control module: operates an air compressor of the suspension system when the pressure increase signal is in the first state; and disables operation of the air compressor when the pressure increase signal is in the second state.

A suspension control method for a vehicle, includes, in response to a startup of the vehicle: selectively setting a pressure increase signal to a first state when an air pressure within air bags of a suspension system is less than a predetermined pressure; and selectively setting the pressure increase signal to a second state when the air pressure is greater than the predetermined pressure. The suspension control method further includes, in response to the startup of the vehicle, operating an air compressor of the suspension system when the pressure increase signal is in the first state; and disabling operation of the air compressor when the pressure increase signal is in the second state.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A rear suspension system of a vehicle may include air bags, shocks, and/or springs. The air bags enable ride height of a vehicle and a combined spring rate of the air bags and the springs to be adjusted. A control module, such as a chassis control module, controls an air compressor and a release valve to regulate pressure within the air bags. The control module may control pressure within the air bags, for example, based on a desired ride height and/or a desired spring rate.

When the vehicle is started (e.g., at key ON), pressure within the air bags may be less than a predetermined pressure. When the pressure within the air bags is less than the predetermined pressure, the air bags may contact one or more nearby components, such as the shocks, which may cause the air bags to fail. Additionally or alternatively, the air bags may overheat and/or fail due to a loss of rigidity when the pressure within the air bags is less than the predetermined pressure.

To prevent the air bags from being damaged due to low pressure within the air bags, the control module could operate the compressor each time that the vehicle is started. If the pressure within the air bags is greater than the predetermined pressure when the vehicle is started, however, operation of the compressor may be unnecessary. Operation of the compressor when the pressure within the air bags is greater than the predetermined pressure at vehicle startup may unnecessarily consume energy and may produce noise and/or vibration.

Accordingly, in response to a startup of the vehicle, the control module of the present disclosure determines whether the pressure within the air bags is less than the predetermined pressure. If so, the control module may operate the compressor to increase the pressure within the air bags to greater than the predetermined pressure. If not, the control module may disable operation of the compressor to prevent unnecessary energy consumption, noise, and vibration.

Figure 1:
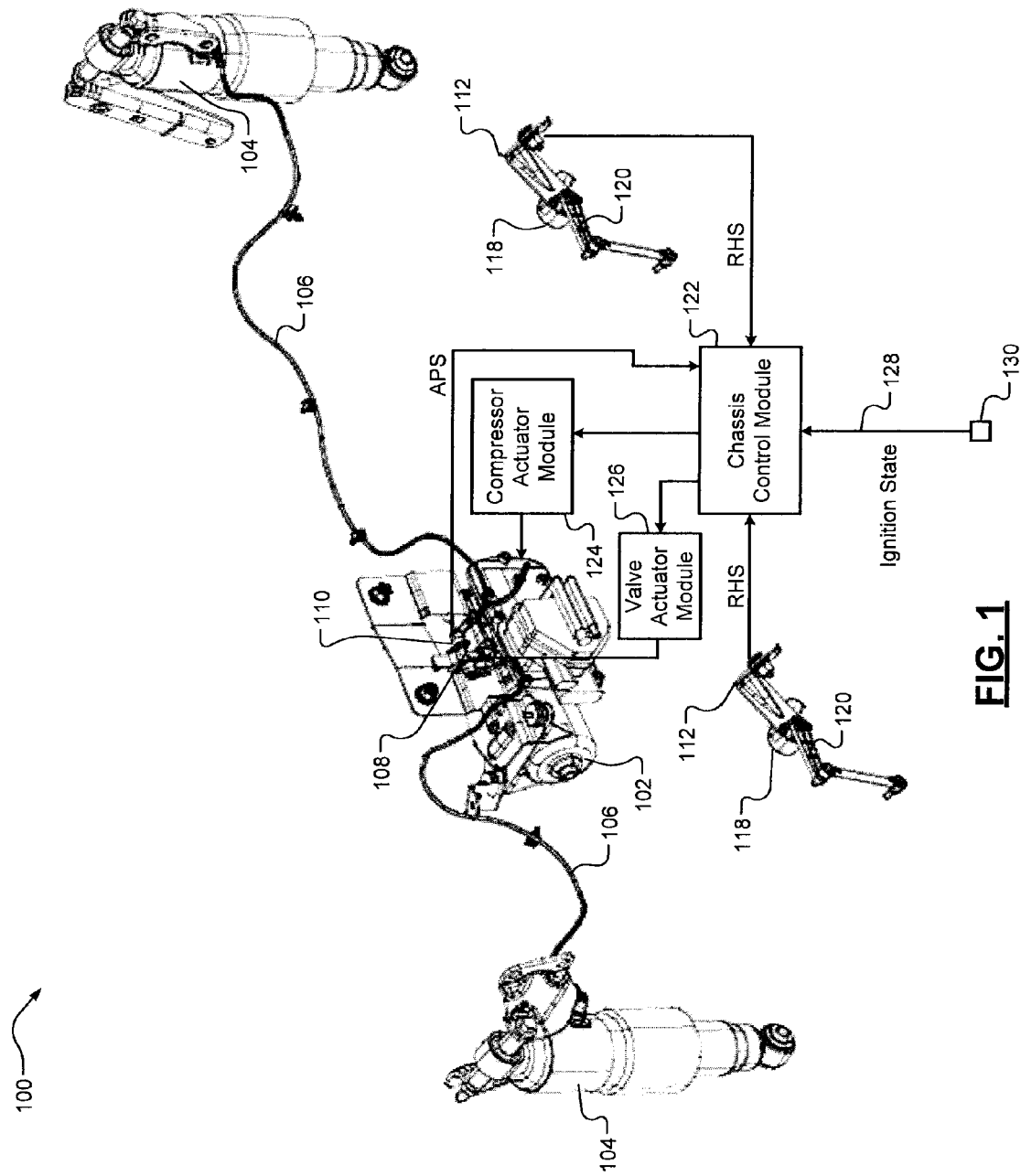
FIG. 1 includes a perspective view and a functional block diagram of an example suspension system according to the present disclosure.

Referring now to FIG. 1, a suspension system 100 of a vehicle includes an air pump or compressor 102, air bags 104, air lines 106, a control valve 108, a pressure sensor 110, and ride height sensors 112. The air compressor 102 is selectively operated to pressurize air in (i.e., pump air to) the air bags 104. The air compressor 102 may be electrically or mechanically (e.g., engine) driven. The air bags 104 may be included in air shocks or air springs. Although the suspension system 100 is depicted as an air suspension, the present application is also applicable to other types of suspension systems.

The air lines 106 are connected between the air compressor 102 and the air bags 104. The control valve 108 may be adjusted to release air from the air bags 104. For example, opening of the control valve 108 may be controlled to regulate air release from the air bags 104. The control valve 108 and the pressure sensor 110 may be included in the air compressor 102, the air bags 104, and/or the air lines 106.

The pressure sensor 110 measures a pressure (of air) within the air bags 104 and generates an air pressure signal (APS) based on the pressure within the air bags 104. The ride height sensors 112 each measure a ride height of the vehicle and generate a ride height signal (RHS) based on the ride height of the vehicle. The ride height sensors 112 each include a sensor body 118 and a sensor arm 120. The sensor body 118 may be mounted to a frame or body, and the sensor arm 120 may be attached to a suspension component such as a linkage.

The sensor body 118 houses a sensor that measures a position (e.g., an absolute position) of the sensor arm 120 relative to the sensor body 118 and/or movement of the sensor arm 120 relative to the sensor body 118. The sensor may be an inductive sensor (e.g., an anisotropic magneto-resistance sensor), an optical sensor, a Hall Effect sensor, or another suitable type of ride height sensor. Although the suspension system 100 is depicted as including two ride height sensors, the suspension system 100 may include more or less ride height sensors.

A control module, such as a chassis control module 122, controls the pressure within the air bags 104. While the chassis control module 122 will be discussed, the control module can be implemented in other modules or independently. Pressure within the air bags 104 may be controlled, for example, to achieve a desired ride height during operation of the vehicle. The chassis control module 122 controls the air compressor 102 and/or the control valve 108 to adjust the pressure within the air bags 104. For example, the chassis control module 122 may operate the air compressor 102 to increase pressure within the air bags 104, and the control module may open the control valve 108 to decrease pressure within the air bags 104. A compressor actuator module 124 controls operation of the air compressor 102 based on signals from the chassis control module 122. A valve actuator module 126 controls actuation (e.g., opening and closing) of the control valve 108 based on signals from the chassis control module 122.

When the vehicle is started, pressure within the air bags 104 may be less than a predetermined pressure. The predetermined pressure may be calibratable and may be set, for example, to approximately 18% of a predetermined maximum pressure of the air bags 104. For example only, the predetermined pressure may be approximately 20 pounds per square inch (psi) or another suitable pressure. When the pressure within the air bags 104 is less than the predetermined pressure, the air bags 104 may contact (rub against) one or more nearby components, such as shocks that surround the air bags 104. Additionally or alternatively, the air bags 104 may overheat and/or fail due to a loss of rigidity when the pressure within the air bags 104 is less than the predetermined pressure.

To prevent the air bags 104 from being damaged due to low pressure within the air bags 104, the chassis control module 122 could operate the air compressor 102 each time that the vehicle is started. If the pressure within the air bags 104 is greater than the predetermined pressure when the vehicle is started, however, operation of the air compressor 102 may be unnecessary. Operation of the air compressor 102 when the pressure within the air bags is greater than the predetermined pressure at vehicle startup may unnecessarily consume energy and may produce noise and/or vibration.

Accordingly, in response to startup of the vehicle, the chassis control module 122 determines whether the pressure within the air bags 104 is less than the predetermined pressure. If so, the chassis control module 122 may operate the air compressor 102 to increase the pressure within the air bags 104 to greater than the predetermined pressure. If not, the chassis control module 122 may disable operation of the air compressor 102 to prevent unnecessary energy consumption, noise, and vibration. The chassis control module 122 may later transition to controlling the air compressor 102 and the control valve 108, for example, to achieve the desired ride height.

An ignition state 128 indicates a state of an ignition switch 130 of the vehicle, such as Off, Accessory, On/Run, or Crank. The ignition switch 130 may be actuated, for example, by a driver using a key, one or more buttons, one or more switches, and/or one or more ignition input devices. The ignition state 128 transitioning from Off to On or one or more other suitable indicators may indicate a startup of the vehicle.

Figure 2:
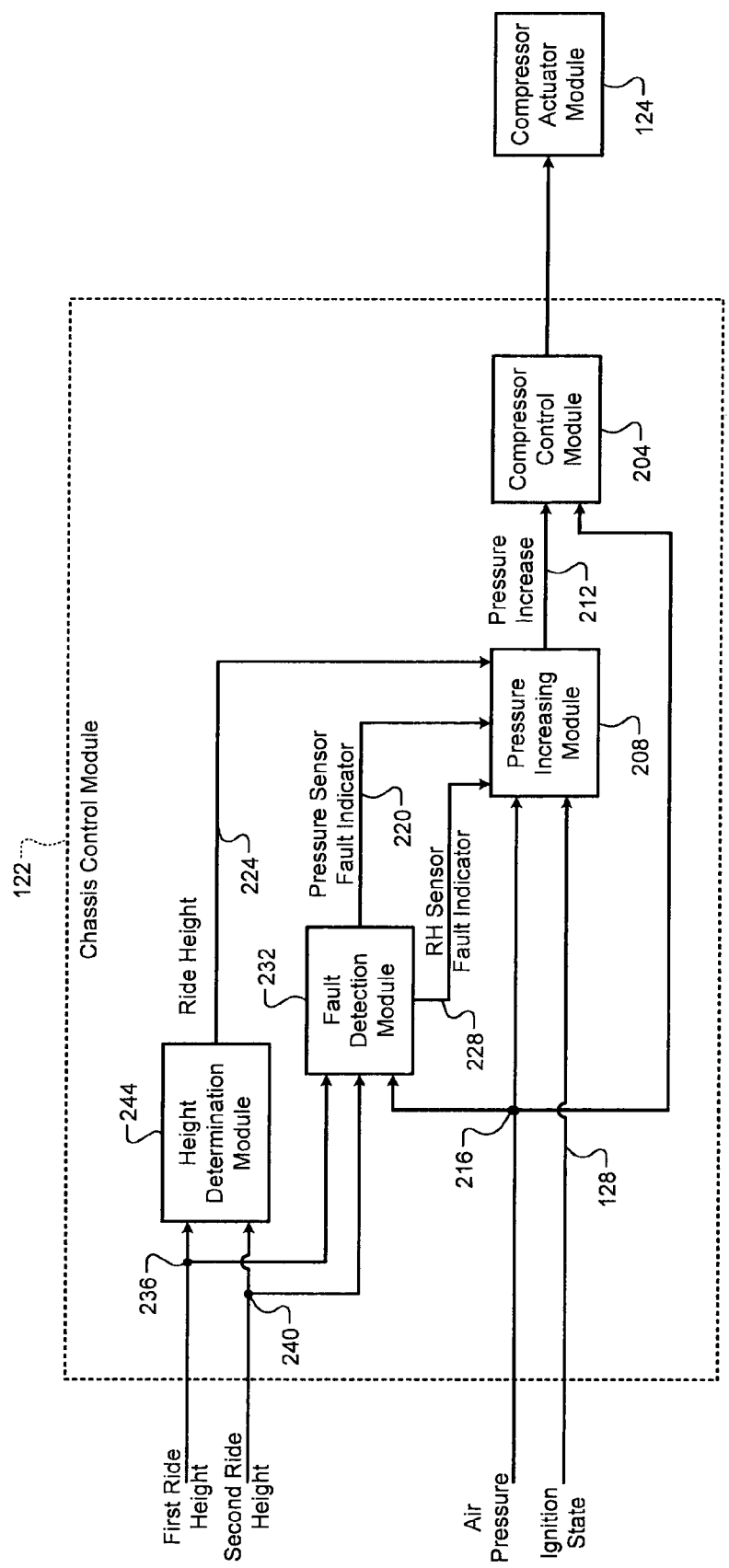
FIG. 2 is a functional block diagram of an example suspension control system according to the present disclosure.

Referring now to FIG. 2, a functional block diagram of an example implementation of the chassis control module 122 is presented. A compressor control module 204 controls operation of the air compressor 102 via the compressor actuator module 124. For example only, the compressor control module 204 may control application of electrical power to the air compressor 102.

In response to a startup of the vehicle, a pressure increasing module 208 generates a pressure increase signal 212. Startup of the vehicle may be indicated, for example, by the ignition state 128. For example only, startup of the vehicle may be indicated by the ignition state 128 transitioning from the Off state to one of the On/Run state or the Crank state. A starter motor drives the engine to start the engine when the ignition state 128 is in the Crank state.

The pressure increasing module 208 sets the pressure increase signal 212 to one of a first state and a second state. When the pressure increase signal 212 is in the first state, the compressor control module 204 operates the air compressor 102 to increase the pressure within the air bags 104 to greater than the predetermined pressure. When the pressure increase signal 212 is in the second state, the compressor control module 204 disables operation the air compressor 102. After the operation of the air compressor 102 to increase the pressure or the disabling of operation of the air compressor 102, the compressor control module 204 may transition to controlling operation of the air compressor 102, for example, based on the desired ride height.

When the pressure increase signal 212 is in the first state, the compressor control module 204 may operate the air compressor 102 for a predetermined period to increase the pressure to greater than the predetermined pressure. For example only, the compressor control module 204 may operate the air compressor 102 for approximately 2-4 seconds or for another suitable period after which the pressure within the air bags 104 will be greater than the predetermined pressure.

In various implementations, when the pressure increase signal 212 is in the first state, the compressor control module 204 may determine a compressor period and operate the air compressor 102 for the compressor period. The compressor period is determined to increase the pressure to greater than the predetermined pressure. The compressor control module 204 may determine the compressor period based on an air pressure 216 measured using the pressure sensor 110. For example, the compressor control module 204 may determine the compressor period based on a difference between the air pressure 216 and the predetermined pressure. The compressor control module 204 may, for example, increase the compressor period as the difference between the air pressure 216 and the predetermined pressure increases and vice versa.

In various implementations, when the pressure increase signal 212 is in the first state, the compressor control module 204 may monitor the air pressure 216 and operate the air compressor 102 until the air pressure 216 is greater than the predetermined pressure. The compressor control module 204 may turn off the air compressor 102 when the air pressure 216 is greater than the predetermined pressure by at least a predetermined amount or percentage to ensure that at least the predetermined pressure is achieved.

The pressure increasing module 208 sets the pressure increase signal 212 to one of the first state and the second state based on the air pressure 216, a pressure sensor fault indicator 220, a ride height 224 of the vehicle, and/or a ride height (RH) sensor fault indicator 228. A fault detection module 232 may generate the pressure sensor fault indicator 220 and the ride height sensor fault indicator 228.

The fault detection module 232 determines whether one or more faults are present in the pressure sensor 110 and generates the pressure sensor fault indicator 220 based on the determination. For example, the fault detection module 232 may set the pressure sensor fault indicator 220 to a first state when zero faults are detected in the pressure sensor 110. The fault detection module 232 may set the pressure sensor fault indicator 220 to a second state when one or more faults are detected in the pressure sensor 110. The fault detection module 232 may determine whether one or more faults are present in the pressure sensor 110 based on the air pressure 216 and one or more other suitable parameters.

The fault detection module 232 may determine whether one or more faults are present in one or more of the ride height sensors 112 and generate the ride height sensor fault indicator 228 based on the determination. For example, the fault detection module 232 may set the right height sensor fault indicator 228 to a first state when zero faults are detected in the ride height sensors 112. The fault detection module 232 may set the ride height sensor fault indicator 228 to a second state when one or more faults are detected in one or more of the ride height sensors 112. The fault detection module 232 may determine whether one or more faults are present in one or more of the ride height sensors 112 based on one or more of first and second ride heights 236 and 240 measured using the ride height sensors 112 and/or one or more other suitable parameters. A height determination module 244 may determine the ride height 224 based on one or more of the first and second ride heights 236 and 240. For example, the height determination module 244 may determine the ride height 224 based on an average of the first and second ride heights 236 and 240.

If the pressure sensor fault indicator 220 is in the first state (i.e., zero faults are present in the pressure sensor 110), the pressure increasing module 208 sets the pressure increase signal 212 to one of the first state and the second state based on the air pressure 216. More specifically, the pressure increasing module 208 sets the pressure increase signal 212 to one of the first state and the second state based on a comparison of the air pressure 216 and the predetermined pressure. The predetermined pressure may be calibratable and may be set, for example, to approximately 18% of a predetermined maximum pressure of the air bags 104. For example only, the predetermined pressure may be approximately 20 pounds per square inch (psi) or another suitable pressure.

The pressure increasing module 208 sets the pressure increase signal 212 to the first state when the air pressure 216 is less than the predetermined pressure. In this manner, the compressor control module 204 will operate the air compressor 102 at the vehicle startup to increase the air pressure 216 to greater than the predetermined pressure when the air pressure 216 is less than the predetermined pressure and no faults are present in the pressure sensor 110. When the air pressure 216 is greater than the predetermined pressure, the pressure increasing module 208 may set the pressure increase signal 212 to the second state. In this manner, the compressor control module 204 will disable operation of the air compressor 102 at the vehicle startup to prevent unnecessary energy consumption, noise, and/or vibration associated with operation of the air compressor 102 when the air pressure 216 is greater than the predetermined pressure and no faults are present in the pressure sensor 110.

If the pressure sensor fault indicator 220 is in the second state (i.e., one or more faults are present in the pressure sensor 110), the pressure increasing module 208 sets the pressure increase signal 212 to one of the first state and the second state based on the ride height sensor fault indicator 228 and/or the ride height 224. The pressure increasing module 208 may set the pressure increase signal 212 to the first state when the ride height sensor fault indicator 228 is set to the first state (i.e., zero faults are present in the ride height sensors 112) and the ride height 224 is less than a predetermined ride height. The predetermined ride height may be calibratable and may be set based on a maximum value of the ride height 224 above which operation of the air compressor 102 may overinflate the air bags 104. The pressure increasing module 208 may set the pressure increase signal 212 to the second state when the ride height 224 is greater than the predetermined ride height and/or the ride height sensor fault indicator 228 is set to the second state (i.e., one or more faults are present in one or more of the ride height sensors 112).

Figure 3:
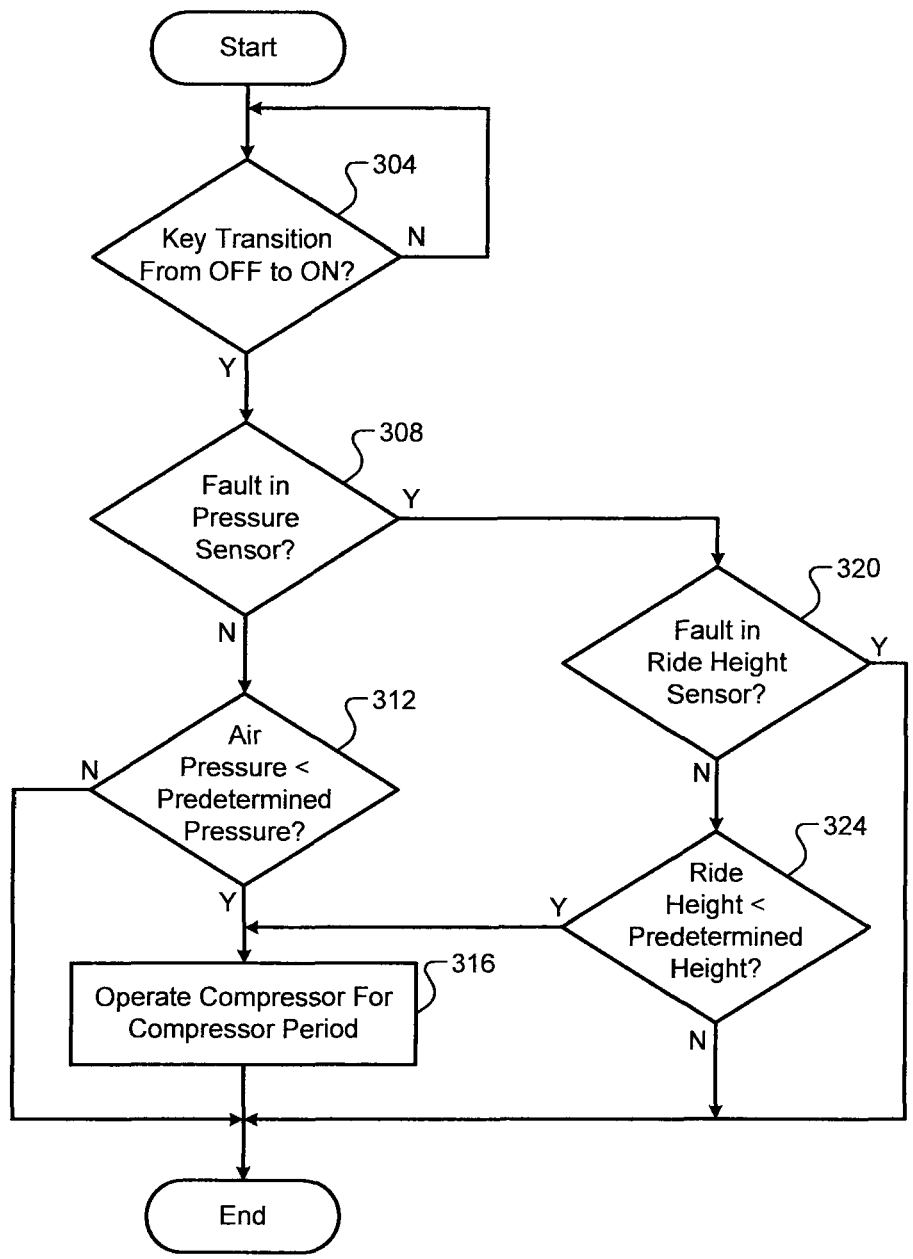
FIG. 3 is a flowchart depicting an example method of controlling an air compressor of a suspension system according to the present disclosure.

Referring now to FIG. 3, a flowchart depicting an example method of controlling the air compressor 102 of the suspension system 100 is presented. The example method of FIG. 3 may be executed, for example, once per key cycle or another suitable period. A key cycle may refer to a period between when a driver initiates a startup of the vehicle (e.g., via the ignition key) and when control modules of the vehicle later power down after the driver initiates shutdown of the vehicle (e.g., via the ignition key).

Control may begin with 304 where control may determine whether the ignition state 128 transitioned from the Off state to one of the On/Run state and the Crank state. If true, control may continue with 308. If false, control may remain at 304. In various implementations, another suitable indicator of a startup of the vehicle may be used.

At 308, control determines whether one or more faults are present in the pressure sensor 110. If true, control transfers to 320, which is discussed further below. If false, control continues with 312. At 312, control determines whether the air pressure 216 measured using the pressure sensor 110 is less than the predetermined pressure. If true, control operates the air compressor 102 at 316 to increase the pressure within the air bags 104 to greater than the predetermined pressure, and control ends. If false, control may refrain from operating the air compressor 102 and end. At 316, control may operate the air compressor 102 for a predetermined period, such as approximately 2-4 seconds or another suitable period. Control may alternatively determine the compressor period based on the air pressure 216 and the predetermined pressure and operate the air compressor 102 for the compressor period at 316.

Referring back to 320 (i.e., when one or more faults are present in the pressure sensor 110), control may determine whether one or more faults are present in one or more of the ride height sensors 112. If true, control may refrain from operating the air compressor 102 and end. If false, control may continue with 324. At 324, control may determine whether the ride height 224 is less than the predetermined ride height. If true, control may operate the air compressor 102 at 316 to increase the pressure within the air bags 104 to greater than the predetermined pressure, and control may end. If false, control may refrain from operating the air compressor 102 and end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A suspension control system for a vehicle, comprising:
a pressure increasing module that, in response to a startup of the vehicle:
selectively sets a pressure increase signal to a first state when an air pressure within air bags of a suspension system is less than a predetermined pressure; and
selectively sets the pressure increase signal to a second state when the air pressure is greater than the predetermined pressure; and
a compressor control module that, in response to the startup of the vehicle:
operates an air compressor of the suspension system when the pressure increase signal is in the first state; and
disables operation of the air compressor when the pressure increase signal is in the second state.

2. The suspension control system of claim 1 wherein the compressor control module operates the air compressor for a predetermined period when the pressure increase signal is in the first state.

3. The suspension control system of claim 2 wherein the predetermined period is set based on increasing the air pressure to greater than the predetermined pressure.

4. The suspension control system of claim 1 wherein the compressor control module determines a compressor period based on the air pressure and the predetermined pressure and, when the pressure increase signal is in the first state, operates the air compressor for the compressor period.

5. The suspension control system of claim 4 wherein the compressor control module determines the compressor period based on a difference between the air pressure and the predetermined pressure.

6. The suspension control system of claim 4 wherein the compressor control module increases the compressor period when the difference between the air pressure and the predetermined pressure increases.

7. The suspension control system of claim 1 further comprising a fault detection module that indicates whether one or more faults are present in an air pressure sensor,
wherein the air pressure is measured by the air pressure sensor, and
wherein the pressure increasing module sets the pressure increase signal to one of the first state and the second state based on the indication of whether one or more faults are present in the air pressure sensor.

8. The suspension control system of claim 1 further comprising a fault detection module that indicates when a fault is present in an air pressure sensor,
wherein the air pressure is measured by the air pressure sensor, and
wherein, in response to an indication that the fault is present in the air pressure sensor and the startup of the vehicle, the pressure increasing module:
selectively sets the pressure increase signal to the first state when a ride height of the vehicle is less than a predetermined ride height; and
selectively sets the pressure increase signal to the second state when the ride height is greater than the predetermined ride height.

9. The suspension control system of claim 8 further comprising a determination module that determines the ride height based on a ride height measured using a ride height sensor.

10. The suspension control system of claim 9 wherein the determination module determines the ride height further based on a second ride height measured using a second ride height sensor.

11. A suspension control method for a vehicle, comprising:
in response to a startup of the vehicle:
selectively setting a pressure increase signal to a first state when an air pressure within air bags of a suspension system is less than a predetermined pressure; and
selectively setting the pressure increase signal to a second state when the air pressure is greater than the predetermined pressure; and
in response to the startup of the vehicle:
operating an air compressor of the suspension system when the pressure increase signal is in the first state; and
disabling operation of the air compressor when the pressure increase signal is in the second state.

12. The suspension control method of claim 11 further comprising operating the air compressor for a predetermined period when the pressure increase signal is in the first state.

13. The suspension control method of claim 12 further comprising setting the predetermined period based on increasing the air pressure to greater than the predetermined pressure.

14. The suspension control method of claim 11 further comprising:
determining a compressor period based on the air pressure and the predetermined pressure; and,
when the pressure increase signal is in the first state, operating the air compressor for the compressor period.

15. The suspension control method of claim 14 further comprising determining the compressor period based on a difference between the air pressure and the predetermined pressure.

16. The suspension control method of claim 14 further comprising increasing the compressor period when the difference between the air pressure and the predetermined pressure increases.

17. The suspension control method of claim 11 further comprising:
indicating whether one or more faults are present in an air pressure sensor, wherein the air pressure is measured by the air pressure sensor; and
setting the pressure increase signal to one of the first state and the second state based on the indication of whether one or more faults are present in the air pressure sensor.

18. The suspension control method of claim 11 further comprising:
indicating when a fault is present in an air pressure sensor, wherein the air pressure is measured by the air pressure sensor; and,
in response to an indication that the fault is present in the air pressure sensor and the startup of the vehicle:
selectively setting the pressure increase signal to the first state when a ride height of the vehicle is less than a predetermined ride height; and
selectively setting the pressure increase signal to the second state when the ride height is greater than the predetermined ride height.

19. The suspension control method of claim 18 further comprising determining the ride height based on a ride height measured using a ride height sensor.

20. The suspension control method of claim 19 further comprising determining the ride height further based on a second ride height measured using a second ride height sensor.

* * * * *